Aug. 9, 1949.    W. T. STEPHENS    2,478,790
CONTROLLED STROKE CYLINDER
Filed June 1, 1946    2 Sheets-Sheet 2
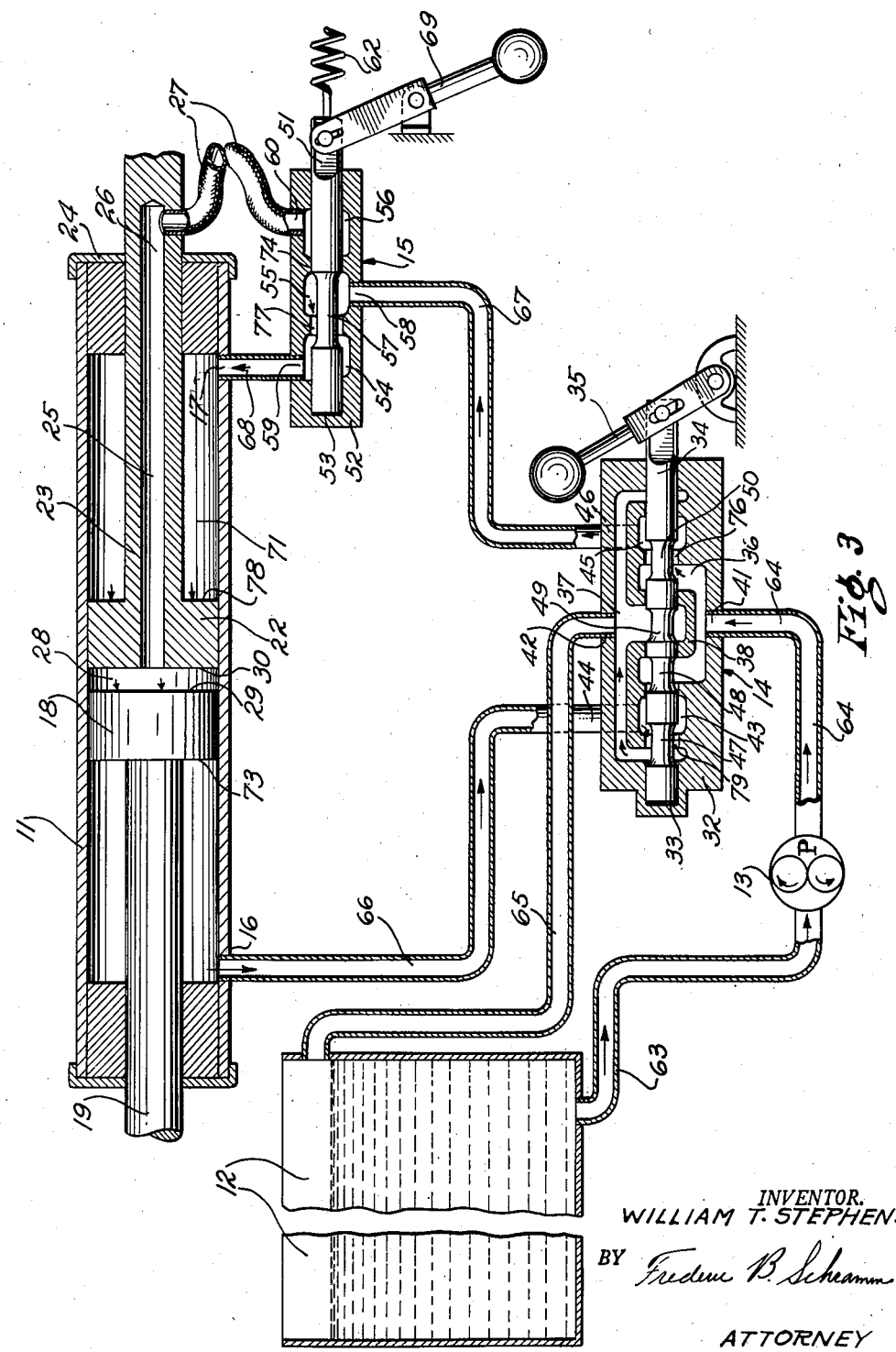
INVENTOR.
WILLIAM T. STEPHENS
BY Frederic B. Schramm
ATTORNEY Patented Aug. 9, 1949

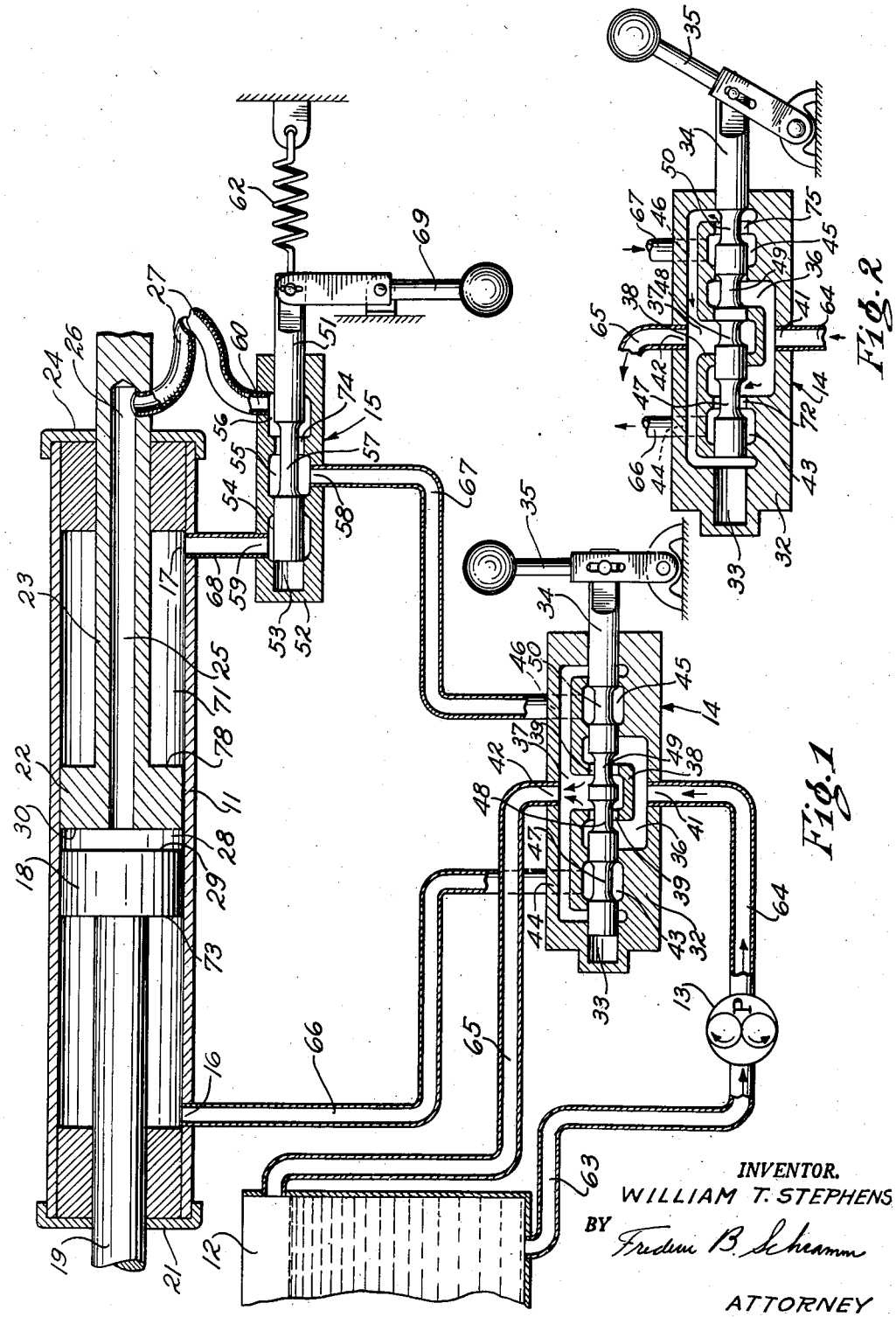

2,478,790

UNITED STATES PATENT OFFICE 2,478,790

CONTROLLED STROKE CYLINDER

William T. Stephens, Painesville, Ohio

Application June 1, 1946, Serial No. 673,805

4 Claims. (Cl. 60—52)

My invention relates to hydraulic operating systems and concerns particularly systems employing double-acting cylinders in which a piston is adapted to be moved in either direction according to the direction of application of fluid pressure, or in which fluid-flow may be produced in one direction or another according to direction of movement of a piston in a double-acting cylinder.

It is an object of my invention to provide adjustment of length of stroke of the piston in hydraulic systems.

A further object of the invention is to provide means for causing adjustment of stroke to be effected by means of the same fluid pressure employed for operating the piston.

Still another object of the invention is to divert oil-flow for the purpose of causing stroke length to be adjusted in one direction or the other according to the direction of oil-flow produced by means normally employed for producing motion in one direction or the other of the operator piston.

Other and further objects, features and advantages of the invention will become apparent as the description proceeds.

In carrying out the invention in accordance with a preferred form thereof, I employ a double-acting cylinder closed at the ends with fluid ports at either end and means for producing flow of oil in or out at one end of the piston according to the direction in which it is desired to move the piston. In addition I provide means for adjusting the length of the stroke of a piston. Preferably this takes the form of a plunger mounted within the cylinder between the piston and the fluid port at one end of the cylinder. The plunger is provided with a shank or rod protruding from the end of the cylinder and packed in the manner of a piston rod. The plunger and the shank or rod thereof have a hollow bore with a connection external to the cylinder by means of which the space within the cylinder between the confronting faces of the piston and the plunger may communicate with an external conduit.

A source of fluid under pressure, such as an oil reservoir and gear pump, are provided and a reversing valve is provided to enable either the delivery or the return-flow conduit of the fluid source to be connected to respective ends of the cylinder. Means are provided for locking the stroke-control plunger in a predetermined position by closing the fluid port at the corresponding end of the cylinder and connecting the bore of the plunger to the fluid supply through the flow-reversing valve so that the plunger face in effect serves as a cylinder end. For changing the length of stroke means are provided for closing the connection to the bore of the plunger instead of to the corresponding end of the cylinder and connecting that end of the cylinder to the fluid supply so that when pressure is applied from the fluid source the stroke-controlled plunger is moved in one direction or the other with the piston.

A better understanding of the invention will be afforded by the following detailed description considered in conjunction with the accompanying drawing, in which Fig. 1 is a schematic diagram of an embodiment of the invention showing the parts largely in longitudinal section with the flow-reversing valve in neutral position;

Fig. 2 is a fragmentary view in longitudinal section of the reversing valve in the position for causing the flow of fluid in such direction as to move the piston to the right as seen in Fig. 1; and Fig. 3 is a schematic diagram of the system illustrating the fluid flow-reversing valve in the opposite position for producing piston and plunger motion to the left instead of to the right and showing the flow-diverting valve in such a position as to close the bore of the stroke-adjusting plunger so that the plunger travels conjointly with the piston.

Like reference characters are utilized throughout the drawing to designate like parts.

The embodiment of the invention illustrated in the drawings comprises a double-acting cylinder 11, a source of suitable fluid such as an oil reservoir 12, means for producing flow of the fluid in a driven direction, which may take the form of a gear pump 13, for example, a flow-reversing valve 14, having a neutral position, a flow-diverting valve 15, and suitable inter-connecting pipes or conduits. Although my invention may be carried out in connection with single-acting cylinders and I may provide length of stroke-adjustment in single-acting cylinders, for the sake of illustration, the invention is shown and described in connection with a double-acting system. Accordingly, the cylinder 11, as shown, is a double-acting cylinder having closed ends except for fluid ports 16 and 17 at the ends of the cylinder. A conventional piston 18 is provided which is adapted to slide in the cylinder 11 and has a piston rod 19 connected thereto or integral therewith for mechanical connection with apparatus to be operated by the piston 18 or for operating the piston 18, as the case may be. The piston rod 19 extends through the left-hand end 21 of the cylinder 11 and suitable packing is provided to prevent leakage.

In addition to the operator piston 18, there is a stroke-control plunger 22 adapted to slide within the cylinder 11. The plunger 22 likewise has a rod or shank 23 connected to or integral with the plunger 22 and extending through the opposite end 24 of the cylinder 11. The shank 23 is likewise provided with suitable packing to prevent leakage through the opening in the cylinder end 24. However, the plunger 22 and its shank 23 are hollow or provided with a central bore 25 extending to a point 26 which remains outside the cylinder 11 at the innermost position of the plunger 22. The outer end 26 of the bore 25 has a conduit 27 connected thereto, thus forming a connection exterior to the cylinder 11 from the space 28 in the interior thereof between the confronting faces 29 and 30 of the piston 18 and the stroke-controlled plunger 22 respectively. Preferably the conduit 27 consists of flexible tubing or a length of flexible tubing is joined thereto in order to permit free movement of the plunger shank 23.

The flow-reversing valve 14 is shown as being of the sliding-plunger type having a body 32 with a central bore 33 in which a plunger 34 is moved under control of an operating lever 35. The body 32 is provided with an inlet chamber 36 and an outlet chamber 37 separated by a folded wall 38 intersected in two ports 39 by the bore 33. The chamber 36 has an inlet opening or port 41 and the chamber 37 has an outlet opening or port 42. There is also a chamber 43 connected by a passageway to a first controlled port 44 and there is a second chamber 45 connected by a passageway to a second controlled port 46. The piston 34 is provided with neck portions or reduced diameter portions 47, 48, 49 and 50, so positioned in relation to chambers 43 and 45 and the partition wall or diaphragm 38 as to leave the ports 39 open when the piston 34 is in a neutral position as illustrated in Fig. 1, and to close communication from the chambers 43 and 45 to either the inlet chamber 36 or the outlet chamber 37. As will be described more in detail in connection with Figs. 2 and 3, the reduced diameter portions are so positioned as to open passageways from the chambers 43 and 45, in one direction or the other, to the inlet and outlet chambers when the piston 34 is moved in one direction or the other.

The flow-diverting valve 15 is also shown as being of the plunger type although the invention is not limited thereto. In the form illustrated, the flow-diverting valve 15 comprises a body 52 having a bore 53 in which a plunger 51 is adapted to slide. The bore 53 is provided with enlargements 54, 55 and 56 and the plunger 51 has a central reduced diameter or neck portion 57. The central chamber 55 has an external opening which may be referred to as a common port 58. The bore enlargements or chambers 54 and 56 have openings 59 and 60 which may be referred to as first and second alternative ports respectively. The length of the plunger neck 57 is such that by moving the plunger 51 in one direction or the other the common port 58 may be connected to one or the other of the alternative ports 59 or 60. Preferably suitable means such as a spring 62 is provided for biasing the plunger 51 of the flow-diverting valve 15 to one of its two alternative positions. As will be explained hereinafter, the normal position is the position for which the cylinder end fluid port 17 is closed and the stroke-adjusting or stroke-controlled plunger conduit 27 is open.

A conduit 63 is provided for supplying the pressure producing pump 13 with oil from the reservoir 12. A delivery conduit 64 is connected between the pump 13 and the inlet port 41 of the fluid-flow reversing valve 14, and a return conduit 65 is provided between the output port 42 of the reversing valve 14 and the reservoir 12. One of the controlled ports of the reversing valve 14, for example, the controlled port 44 is connected to the cylinder end fluid port 16 by means of a conduit 66 and the other controlled port 46 of the reversing valve 14 is connected to the common port 58 of the flow-diverting valve 15 by means of a conduit 67. The first alternative port 59 of the flow-diverting valve 15 is connected to the cylinder end fluid port 17 directly or by means of a length of conduit 68 and the flexible tubing or conduit 27 serves for joining the bore 25 of the stroke-controlled plunger 22 with the second alternative port 60 of the flow-diverting valve 15.

Suitable means such as an operating lever or handle 69, for example, may be provided for shifting the plunger 51 of the flow-diverting valve 15 to the left-hand position, illustrated in Fig. 3, against the force of the biasing spring 62 when it is desired to change the stroke length of the piston 18.

When the plunger 51 of the flow-diverting valve 15 is in its normal or biased position and when the reversing valve 14 has its plunger 34 in its neutral position, illustrated in Fig. 1, both the piston 18 and the plunger 22 are locked in position in the cylinder 11 and the oil-flow produced by the pump 13 is returned directly to the reservoir 12. Owing to the fact that the portions of the bore 33 of the valve 14 are filled on either side of the chamber 43 by the full diameter portions of the plunger 34, no fluid flows into or out of the conduit 66 so that passage of fluid through the port 16 is closed and the piston 18 cannot move toward the left. Similarly the chamber 45 is closed closing the conduit 67, and the chamber 54 of the flow-diverting valve 15 is closed closing the conduit 68. The conduit 27 remains open to the conduit 67, but, since the conduit 67 is closed at the chamber 45 no flow of oil can take place from the right-hand end of the piston 18 or from the space 71 between the cylinder end 24 and the plunger 22. Consequently, the plunger 22 is locked in position and the piston 18 cannot move to the right. Oil cannot escape from the space 28 through the bore 25 nor can the oil be displaced by motion of the plunger 22.

Assuming that the flow-diverting valve 15 remains in the position illustrated in Fig. 1, but, the reversing valve 14 is shifted to the right or to the left, oil flow through the conduits 66 and 67 takes place, causing the piston 18 to move in one direction or the other. For example, if the reversing-valve plunger 34 is moved to the right, to the position shown in Fig. 2, fluid enters through the conduit 64 into the inlet chamber 36 passage through the portion 72 of the valve bore around the reduced diameter portion 47 of the plunger 34 into the chamber 43 out through the conduit 66 into the fluid port 16 of the cylinder 11, applying pressure to the left-hand face 73 of the piston 18, causing it to move to the right. Fluid from the space 28 is permitted to be displaced by the flow of fluid through the plunger bore 25, the conduit 27 into the chamber 56 of the flow-diverting valve 15, through the portion 74 of the valve bore around the reduced diameter portion or plunger neck 57 through the conduit 67 into the chamber 45 of the reversing valve 14 through a portion 75 of the bore 33 of the reversing valve 14 around the reduced diameter portion 50 of the plunger 34 into the outlet chamber 37 of the valve 14 and through the return-flow conduit 65 to the fluid reservoir 12.

The opposite action takes place when the reversing valve 14 is moved leftward to the position shown in Fig. 3, causing the fluid to flow into the cylinder through the conduits 67 and the plunger bore 25 and out of the cylinder through the conduit 66 and causing the piston 18 to move to the left.

When it is desired to change the length of stroke of the piston 18 this is accomplished by causing the plunger 22 to be moved in one direction or the other by the pressure of the same fluid employed for moving the piston 18 and in response to the same setting of the flow-reversing valve 14. For example, if it is desired to shorten the length of stroke, the reversing valve is moved to the left-hand position, illustrated in Fig. 3, and the plunger 51 of the flow-diverting valve 15 is also moved to the left-hand position as illustrated in Fig. 3. In this case oil delivered under pressure by the pump 13 enters through the conduit 64, the inlet port 41 into the inlet chamber 36 of the valve 14, passing through a portion 76 of the valve bore around the reduced diameter portion 50 of the plunger 34 into the chamber 45 and through the conduit 67. In this case, however, the portion 74 of the bore of the diverting valve 15 is closed and the fluid passes instead around the plunger neck 57 through the portion 77 of the valve bore into the chamber 54 out through the first alternative port 59 through the conduit 68 and into the space 71 in the cylinder 11. This action exerts pressure on the back face 78 of the plunger 22 forcing it to the left.

Since the portion 74 of the bore of the diverting valve 15 is closed no fluid can escape through the bore 25 or the outlet conduit 27 of the stroke-controlled plunger 22 and accordingly the left-hand motion of the plunger 22 exerts pressure upon the fluid within the space 28, which can be relieved only by movement of the piston 18 which accordingly moves to the left in response to the pressure acting upon its face 29. The fluid to the left of the face 73 of the piston 18 is permitted to escape through the port 16, the conduit 66 back to the reservoir 12 through the chamber 43 of the reversing valve 14 around the plunger neck 47, through the port 79, to the outlet chamber 37 and through the return conduit 65.

Thus, the plunger 22 and the piston 18 are caused to move conjointly. They move exactly in unison except for any lost motion which may be produced by presence of compressible fluid or air in the system or any leakage which may take place. Any such lost motion or leakage, however, does not interfere with the function of the apparatus in adjusting the stroke since the flow-diverting valve 15 will be left in its stroke-adjusting position until the desired adjustment has been effected, whereupon it will be allowed to resume its normal position under the force of the spring 62 and any correction in movement of the piston 18 is effected by appropriate manipulation of the reversing valve 14. It is manifest that if the reversing valve 14 had been in the right-hand position instead of the left-hand position when the diverting valve 15 was shifted to the control position, the piston 18 and the plunger 22 would have been moved to the right instead of to the left, the direction of oil flow through the conduit 67 and 66 merely having been reversed.

While I have described my invention as embodied in concrete form and as operating in a specific manner in accordance with the provisions of the Patent Statutes, it should be understood that I do not limit my invention thereto, since various modifications thereof will suggest themselves to those skilled in the art without departing from the spirit of my invention, the scope of which is set forth in the annexed claims.

What I claim is:

1. An hydraulic operating system comprising in combination a source of fluid under pressure with delivery and return conduits, a double-acting cylinder having first and second fluid ports at either end, an operator piston slidable in said cylinder, a stroke-control plunger in said cylinder between said piston and the second cylinder fluid port, said plunger having a bore with a connection to a conduit external to the cylinder, a flow-diverting valve, and a flow-reversing valve, said flow-diverting valve having first and second alternative ports and a common port with means for connecting the common port to one or the other of the alternative ports and blocking the connection of the common port to the other alternative port, a fluid connection between the second cylinder port and the first diverting valve port, said plunger conduit being connected to the second diverting valve port, said reversing valve having input and output ports joined to the delivery and return conduits respectively of the fluid source, first and second controlled ports and means for alternatively connecting the first controlled port to the input and the second controlled port to the output port or vice-versa, a connection between the first cylinder port and the first reversing valve control port, and a connection between the second reversing valve control port and the diverting valve common port; whereby the reversing valve normally controls direction of movement of said operator piston in response to pressure of said fluid, and the stroke-control plunger remains stationary, but, shifting of the diverting valve to its first port connection causes the reversing valve to control direction of movement of the stroke-control plunger together with said piston.

2. An hydraulic operating system comprising in combination a source of fluid under pressure with delivery and return conduits, a double-acting cylinder having first and second fluid ports at either end, an operator piston slidable in said cylinder, a stroke-control plunger in said cylinder between said piston and the second fluid cylinder port, said plunger having a bore with a connection to a conduit external to the cylinder, a flow-diverting valve and a flow-reversing valve, said flow-diverting valve having first and second alternative ports and a common port with means for connecting the common port to one or the other of the alternative ports, a fluid connection between the second cylinder port and the first diverting valve port, said plunger conduit being connected to the second diverting valve port, said reversing valve having input and output ports each joined to one of the fluid source conduits, first and second controlled ports, and means for alternatively connecting the first controlled port to the input port and the second controlled port to the output port or vice-versa, a connection between the first cylinder port and the first reversing valve controlled port and a connection between the second reversing valve controlled port and the diverting valve common port.

3. An hydraulic operating system comprising in combination a source of fluid under pressure with delivery and return conduits, a double-acting cylinder having first and second fluid ports at either end, an operator piston slidable in said cylinder, a stroke-control plunger in said cylinder between said piston and the second fluid cylinder port, said plunger having a bore with a connection to a conduit external to the cylinder, a flow-diverting valve having first and second alternative ports and a common port with means for connecting the common port to one or the other of the alternative ports, a fluid connection between the second cylinder port and the first diverting valve port, said plunger conduit being connected to the second diverting valve port, a connection between one of the fluid source conduits and the first cylinder port and a connection between the other fluid source conduit and the diverting valve common port whereby the setting of said flow-diverting valve to the second alternative port connection results in locking of the stroke-controlled plunger and movement of the operator piston according to direction of fluid control or vice versa, and a setting of the diverting valve to the first alternative port connection causes joint movement of the operator piston and the stroke-control plunger.

4. Variable stroke hydraulic apparatus comprising a double-acting cylinder, an operator piston in said cylinder, a stroke control plunger in said cylinder, a first fluid port in said cylinder disposed between said operator piston and one end of the cylinder, a second fluid port in the cylinder disposed between said stroke control plunger and the other end of the cylinder, a third fluid port leading to the space between said operator piston and plunger, valve mechanism connected with said second and third ports and having port means for connection with a fluid circulating system, said valve means being arranged so that with the valve means in one position it connects said valve port means to said second cylinder port and blocks the third cylinder port whereas with the valve means in another position it connects said valve port means to said third cylinder port and blocks said second cylinder port.

WILLIAM T. STEPHENS.

REFERENCES CITED

The following references are of record in the file of this patent:

UNITED STATES PATENTS

| Number | Name | Date |
| --- | --- | --- |
| 2,005,387 | Pelton | June 18, 1935 |